Jan. 2, 1968 — J. R. SWEENEY — 3,360,911

FILTER

Filed Dec. 23, 1963

INVENTOR.
JAMES R. SWEENEY
BY
HIS ATTORNEYS

United States Patent Office 3,360,911
Patented Jan. 2, 1968

3,360,911
FILTER
James R. Sweeney, Galesburg, Ill., assignor to Bixby-Zimmer Engineering Company, Galesburg, Ill., a partnership
Filed Dec. 23, 1963, Ser. No. 332,822
1 Claim. (Cl. 55—489)

This invention relates to a filter and more particularly to a welded air polution filter of metallic construction. However, the invention is not necessarily so limited.

In the treatment of industrial gases before they are released to the atmosphere, and more particularly in the treatment of exhaust air from smoke stacks, special techniques are required to remove very small particles present in the gases, that is, particles having dimensions in the order of one micron. Particles of this small size settle out of the atmosphere only very slowly and once settled they are easily returned to the atmosphere by normal surface wind currents. Inhalation of such particles into the lungs constitutes a health problem, of which the public is becoming increasingly conscious.

An exceptionally effective means for entrapment and removal of such particles near the source is a technique known as air scrubbing. In the process of air scrubbing the contaminated gas or air is drawn through a confining chamber and in passing through the chamber the contaminated air is caused to move through a mist or spray of wetting agent such as water. As the particulate contaminants in the air move through the spray they are moistened, with a substantial portion of the particles becoming entrapped in droplets of the wetting agent. This wetting process substantially increases the mass associated with the contaminating particles.

Immediately after treatment of the contaminated air with the mist or spray, the air is drawn through a specially designed filter which takes advantage of the increased mass associated with the contaminating particles and also any tackiness imparted to the particles as a result of the spray treatment.

The more suitable filters for this purpose are filters which establish a maze or labyrinth through which the contaminated air must pass. In the maze or labyrinth the air is caused to go around corners, in effect, and the air, being much lighter than the moistened particles therein, negotiates the corners freely, whereas the wet and relatively heavy particles continue in a straight line to impinge upon walls forming the labyrinth. Since the particles have been made moist, they are relatively tacky and agglomerate on the interfering wall surfaces, so as to be readily collected in suitable disposal containers. With properly designed filters decontaminating efficiencies in the range of 97% to 99% are readily obtained.

While this high operating efficiency is readily attained with properly constructed equipment, a difficultly is encountered in that the high operating efficiency is not readily maintained. The design of the labyrinth filters is critical, especially in the dimensions of the labyrinth channels established in the filter. The velocity of air movement required for efficiency of operation is substantial and vibration of the elements comprising the labyrinth filters is difficult to avoid. A chief cause of failure in prior filters is attributed to a shifting or bending of the elements comprising the filter with the result that the carefully dimensioned labyrinth channels originally built into the filter move out of optimum dimensions. This results not only in a loss of operating efficiency but also in an unduly high maintenance cost due to the need for periodic adjustment or replacement of deflective filters.

An object of the present invention is to provide a new and improved filter for use in the removal of particulate matter from fluid streams, particularly air streams.

Another object of the present invention is to provide a new and improved filter embodying a welded construction capable of retaining critical dimensions.

Other objects and advantages reside in the construction of parts, the combination thereof, as will become more apparent from the following description.

Figure 1:
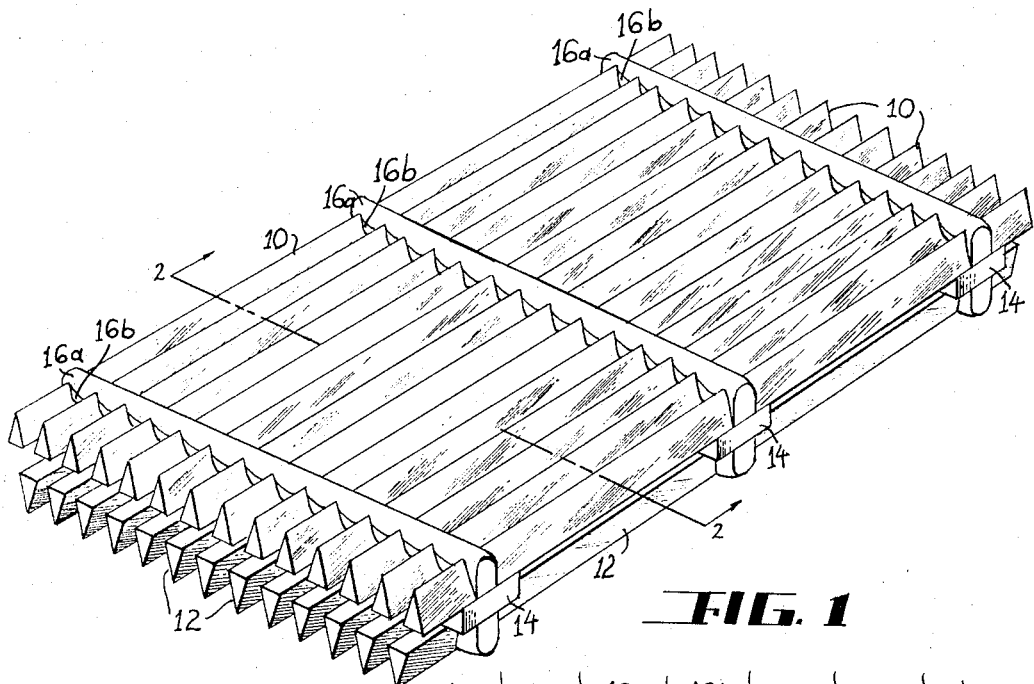
FIGURE 1 is a perspective view of a filter constructed in accordance with the present invention.

Referring to the drawing in greater detail, the filter of FIGURE 1 comprises confronting upper and lower grids of parallel wire elements. The upper grid comprises wire elements identified with the reference numeral 10 and the lower grid comprises wire elements identified with the reference numeral 12.

Each of the wire elements 10 and 12 has a triangular cross section comprising two relatively broad sides of equal dimension joined by a comparatively narrow base.

In each grid the wire elements comprising the grid are disposed in spaced and parallel relation and the bases of the wire elements in each grid occupy a common plane. The space or gap between adjacent wire elements in each grid is slightly less than the width of the bases in the opposite grid. Thus, if the bases of the wire elements 12 in the lower grid illustrated in FIGURE 1 are ⅛" in width, the separation between the wire elements 10 in the upper grid of FIGURE 1 might be 3/32".

While the upper and lower grids of FIGURE 1 comprise wire elements having the same dimensions, it will be recognized by those skilled in the art that the dimensions of the wire elements 10 in the upper grid are not necessarily identical to the dimensions of the wire elements 12 in the lower grid, the important characteristic being that the separation between the wire elements in one grid is less than the width of the bases of the wire elements in the opposing grid.

Interposed between the opposing upper and lower grids are a plurality of transverse spacer bars 14, these bars having longitudinal axes which extend substantially perpendicular to the longitudinal axes of the wire elements 10 and 12 forming the upper and lower grids. The spacer bars 14, which are the same thickness, each have an upper surface contacting the bases of the wire elements in the upper grid and the lower surface contacting the bases of the wire elements in the lower grid. The thickness of the spacer bars thus determines the separation between the upper and lower grids. As illustrated in FIGURE 1, the spacer bars 14 are located intermediate and spaced from the ends of all wire elements 10 and 12.

In the assembly of the filter, the wire elements 12 comprising the lower grid are assembled in spaced relation upon the spacer bars 14, suitable fixtures being employed to temporarily establish and maintain the spacing between the parallel wire elements. The wire elements 12 are then welded to the spacer bars 14 and the assembly inverted to expose the opposite surfaces of the spacer bars.

The wire elements 12 are then assembled upon said opposite surfaces of the spacer bars 14 to form the lower grid, suitable fixtures being employed to temporarily establish and maintain the spacing between the wire elements 12. In assembling the lower grid one of the wire elements 12 is centered directly over the gap or space between each pair of adjacent wire elements 10. As a result the wire elements 12 are staggered with respect to the wire elements 10 and each has a projection upon the plane of the bases of the wire elements 10 which overlaps the gap between the wire elements 10 which is directly opposite thereto. The assembly is completed by welding the wire elements 12 to the surfaces of the spacer bars 14.

Figure 3:
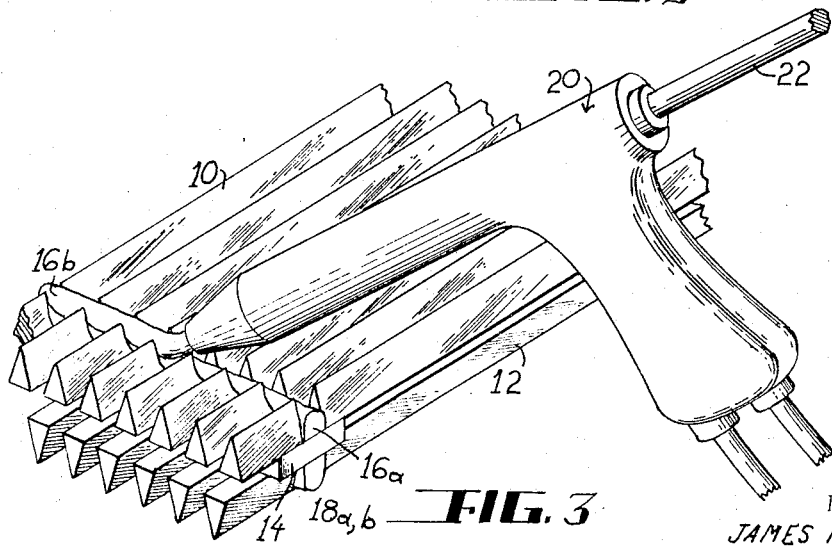
FIGURE 3 is a fragmentary perspective view illustrating an operation performed in the construction of the filter of FIGURE 1.

The welding is accomplished in the fashion illustrated in FIGURE 3. Employing an arc welding gun 20 which continuously feeds a welding rod 22 through its nozzle to the filter assembly, the welding rod is heated and softened for deposit on the work by an electrical current passing between the assembly and the welding gun. The current is established by providing a potential difference between the wire elements in the assembly and the welding gun. As illustrated in FIGURE 3, a first bead 16a of weld material is laid upon the wire elements 10 forming the upper grid above one of the spacer bars 14. The heat of this first welding step causes the bead 16a to cut into the apices of the wire elements 10 and to settle upon and fuse with the spacer bar 14. The welding rod as deposited upon the assembled filter elements has a thickness which is only half the height of the wire elements on the spacer bars. Accordingly, with the bead 16a in place, a second bead 16b is laid upon the first bead 16a, filling the gaps cut into the apices of the wire elements 10 by the bead 16a. The result is an accumulation of weld material having a height substantially equaling the height of the apices of the wire elements 10.

It is to be understood that in FIGURE 3 similar weld beads 18a and 18b are already laid upon the wire elements 12 at the time the weld beads 16a and 16b are laid upon the wire elements 10.

With this type of welding operation, the several wire elements 10 and 12 forming the upper and lower grids are fixed to the spacer bars 14 in a manner which positively controls the separation between the wire elements of each grid and at the same time positively controls the separation between the grids. The resulting product is an exceptionally rugged filter having accurately established dimensions.

Figure 2:
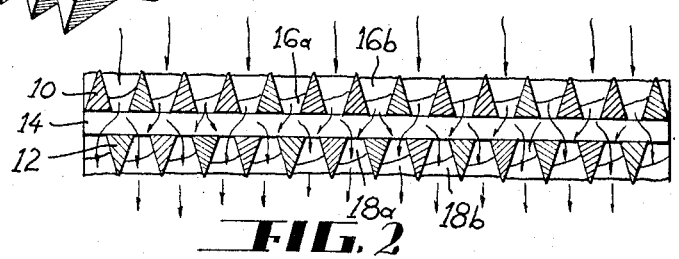
FIGURE 2 is a sectional view taken substantially along the line 2—2 of FIGURE 1.

FIGURE 2 illustrates the suitability of the present filter for use in air scrubbing operations, such as previously described. In the upper portion of the figure are arrows illustrating downward direction of an air current. As the air advances upon the upper grid it moves freely through the gaps between the wire elements 10 therein. However, immediately upon passing through these gaps the air is confronted by the bases of the wire elements 12 and must veer either to the left or the right before it can move through the gaps between the wire elements 12. It is believed apparent that any relatively heavy particles carried in the air will be unable to negotiate the sudden change of direction required and will impinge upon the bases of the wire elements 12. These bases become moist due to the presence of droplets in the air and particles impinging upon the bases of the wire elements 12 are therefore agglomerated on these bases.

For optimum operating efficiency, it is found that the separation between the upper and lower grids should approximately equal the width of the bases of the wire elements of the lower grid.

In air scrubbing operations such as previously described, a number of filters such as that illustrated in the drawing are placed in the chamber through which the contaminated air is moved for decontamination, the arrangement being such that the contaminated air is caused to pass successively through more than one filter. Depending upon the nature of the contaminated air, as determined by the source, the successive filters through which the air passes are varied. For example, the second filter may have smaller gaps between adjacent wire elements and may have a correspondingly smaller separation between opposing grids in the filter. It is also found advantageous to incline the filters with respect to the direction of air movement, the inclination being such that the ends of the wire elements at one end of the filter are located vertically above the ends of the wire elements at the other end of the filter. This inclination of the filter causes material agglomerating on the bases of the wire elements 12 to slide downwardly on the collecting bases and ultimately drop off the filter. The material dropping off the filters, which comprises relatively dense agglomerates, is collected in suitable collecting basins. The inclination of the filters also helps to clear the upper surface of the filter of materials too large to enter the filter. Such materials slided own the inclined upper surface of the screen between adjacent wire elements therein and if sufficiently large will roll over the weld beads. For this purpose it is desirable that the weld beads do not rise appreciably above the apices of the wire elements in the upper grid.

The desired angle of inclination of the filters varies with the size of the contaminating particles in the air stream and therefore may vary among successive filters. In general the angle of inclination varies between 30° and 60° with respect to the direction of air movement.

The use of a triangular shape in the wire elements, as shown in the drawing, is found desirable for the reason that air advancing upon the upper grid is caused to merge into a converging path and is thereby caused to accelerate with the result that particulate matter carried by the air acquires a substantial momentum as it advances upon the base surfaces of the wire elements 12 which confront the grid. This enhanced momentum assures that the particulate matter in the air stream will strike the bases of the wire elements 12. The triangular shape in both grids enables reversal of the filters, so as to distribute wear equally on both grids of the filter.

While the triangular shape has the beneficial effect described above, it will occur to those skilled in the art that other cross-sectional shapes for the wire elements 10 and 12 will be operative in the filter of the present invention, although some may prove less efficient than others.

For purposes of durability the preferred metal employed in the present filter construction is a stainless steel. It will be recognized, however, that other types of metals may be employed in the present invention, the desirable characteristics being ease of welding, a resistance to abrasion produced by impingement of water droplets and other particulate matter, and a resistance to corrosion by the chemicals present in the air or other fluid to be decontaminated.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. A filter device comprising, in combination, first and second grids disposed in spaced and parallel confronting relation, each said grid comprising a plurality of spaced parallel wire elements contacting a common plane, the wire elements in said first grid each opposing and extending parallel to a space between adjacent wire elements in said second grid and each having a width not less than the width of said opposing space, a plurality of spacer elements interposed between said grids and contacting each wire element in each grid, and means fixedly securing each wire element in each grid to each of said spacer elements whereby said spacer elements fix the separation between said grids and between said wire elements in each grid, at least one of said spacer elements being disposed intermediate and spaced from the ends of the wire elements in each said grid.

References Cited

UNITED STATES PATENTS

| | | | |
|---|---|---|---|
| 1,615,686 | 1/1927 | Eschholz | 219—137 |
| 2,037,164 | 4/1936 | Harrah | 55—489 |
| 2,764,257 | 9/1956 | Brixius | 55—489 |
| 3,012,130 | 12/1961 | Harrison | 219—137 |
| 906,083 | 12/1908 | Terry | 55—444 |
| 1,794,908 | 3/1931 | Kreft | 55—481 |
| 3,141,910 | 7/1964 | Pearce | 55—257 |
| 2,532,332 | 12/1950 | Rowand | 55—444 |

FOREIGN PATENTS

| | | |
|---|---|---|
| 346,613 | 1905 | France. |
| 1,026,251 | 3/1958 | Germany. |

HARRY B. THORNTON, *Primary Examiner.*

B. NOZICK, *Assistant Examiner.*